(12) United States Patent
Bosse

(10) Patent No.: US 7,677,636 B2
(45) Date of Patent: Mar. 16, 2010

(54) METHOD FOR CONTROLLING A POWER-OPERATED VEHICLE ACCESSORY, IN PARTICULAR A POWER-OPERATED FOLDING HARDTOP ROOF

(75) Inventor: Rolf Bosse, Orchard Lake, MI (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 459 days.

(21) Appl. No.: 11/699,976

(22) Filed: Jan. 30, 2007

(65) Prior Publication Data
US 2008/0180236 A1 Jul. 31, 2008

(51) Int. Cl.
B60J 7/08 (2006.01)
(52) U.S. Cl. ....................................... 296/108
(58) Field of Classification Search ................ 296/108; 307/10.1, 10.7; 324/430, 432, 433
See application file for complete search history.

(56) References Cited

U.S. PATENT DOCUMENTS

| 4,307,789 | A | | 12/1981 | Bertot | |
|---|---|---|---|---|---|
| 5,130,659 | A | | 7/1992 | Sloan | |
| 5,208,483 | A | * | 5/1993 | Reneau | 307/10.1 |
| 5,281,919 | A | * | 1/1994 | Palanisamy | 324/427 |
| 5,321,345 | A | * | 6/1994 | Lambros et al. | 318/483 |
| 5,900,734 | A | * | 5/1999 | Munson | 324/433 |
| 6,097,193 | A | | 8/2000 | Bramwell | |
| 6,144,110 | A | * | 11/2000 | Matsuda et al. | 307/10.1 |
| 6,424,157 | B1 | | 7/2002 | Gollomp et al. | |
| 6,472,875 | B1 | | 10/2002 | Meyer | |
| 6,664,792 | B1 | * | 12/2003 | Nguyen | 324/433 |
| 6,762,513 | B2 | | 7/2004 | Landgraf et al. | |
| 7,014,247 | B2 | | 3/2006 | Dilluvio | |
| 7,039,534 | B1 | * | 5/2006 | Ryno et al. | 702/63 |
| 7,063,371 | B2 | | 6/2006 | Willard | |
| 7,205,746 | B2 | * | 4/2007 | Batson | 320/107 |
| 2004/0027001 | A1 | * | 2/2004 | Reed, III | 307/10.1 |
| 2004/0061379 | A1 | * | 4/2004 | Gohlke | 307/11 |
| 2005/0285445 | A1 | | 12/2005 | Wruck et al. | |

* cited by examiner

Primary Examiner—Hilary Gutman
(74) Attorney, Agent, or Firm—Manfred Beck, P.A.

(57) ABSTRACT

A motor vehicle configuration includes a folding roof and an electro-hydraulic system for moving the folding roof between a closed position and an open position. A roof actuation request for moving the folding roof from the closed position to the open position is blocked if the total number of roof actuation requests occurring in a period when the engine is off has reached a given maximum number in order to protect the vehicle battery. A display provides a driver alert information if the total number of roof actuation requests occurring in the period when the engine is off has reached the given maximum number. A method for controlling a power-operated vehicle roof is also provided.

17 Claims, 4 Drawing Sheets

METHOD FOR CONTROLLING A POWER-OPERATED VEHICLE ACCESSORY, IN PARTICULAR A POWER-OPERATED FOLDING HARDTOP ROOF

BACKGROUND OF THE INVENTION

Field of the Invention

The invention generally relates to a method for controlling a power-operated vehicle accessory. The invention relates in particular to a method for controlling a power-operated vehicle roof and to a motor vehicle configuration including a power-operated vehicle roof.

Modern motor vehicles have a number of power-operated vehicle accessories that can be powered by the vehicle battery. The vehicle battery is dimensioned such that these vehicle accessories, such as power windows, power-operated doors, sun roofs or folding hardtop roofs, can be operated even when the engine of the vehicle is not running and thus the alternator does not provide electrical power for the electric motors that drive these vehicle accessories. In some cases however, the vehicle battery may become completely discharged when power-operated vehicle accessories are repeatedly used while the vehicle engine is shut off. The state of charge of the vehicle battery may then be so low that it is no longer possible to start up the engine. The vehicle battery may even be damaged as a result of being discharged. Various methods for preventing problems resulting from the operation of power-operated vehicle accessories that drain the vehicle battery are disclosed in the prior art.

U.S. Pat. No. 6,762,513 B2 discloses an electrical accessory device controller system and process for controlling for a motor vehicle having a vehicle battery and an alternator. The electrical accessory device controller system has an electrical interface for an electrical accessory device, a device for detecting the voltage of the vehicle electrical system, and a power supply control unit to connect the electrical accessory device to the battery according to the detected battery voltage or to disconnect the electrical accessory device from battery. An auxiliary energy storage device, which can be recharged by the alternator and which is connected to the power supply control unit, is furthermore provided. The power supply control unit is configured such that depending on the detected voltage of the vehicle electrical system the power supply control unit electrically connects or disconnects the auxiliary power storage device or the vehicle battery to the electrical accessory device. U.S. Pat. No. 6,762,513 B2 provides an auxiliary energy storage device in order to prevent the vehicle battery from being completely discharged. A disadvantage of this configuration is that an auxiliary power storage device and additional hardware must be installed in addition to the main battery of the vehicle, which increases the cost as well as the weight of the motor vehicle.

U.S. Pat. No. 4,307,789 discloses a configuration for controlling openable panels of a motor vehicle, such as the doors of the motor vehicle, the lid of the rear luggage compartment, the sliding roof or other panels. The configuration includes in each panel a latch which is opened by means of an electric control device. Each of the control devices is connected in series with at least one switch actuating this control device in a panel circuit. All of the panel circuits are connected in parallel to a source of current through at least one switch for locking or unlocking simultaneously all the panels. The source of current includes, in addition to the main battery of the vehicle, a buffer battery connected in parallel and located in the passenger compartment of the motor vehicle. A blocking component such as a diode is provided for preventing a possible discharging of the buffer battery into the main battery. The configuration disclosed in U.S. Pat. No. 4,307,789 ensures that the panels such as the vehicle doors can be unlocked in case the main battery of the motor vehicle is damaged, for example in case of an accident. A disadvantage of this configuration is that the buffer battery increases the cost as well as the weight of the motor vehicle.

U.S. Patent Application Publication No. 2005/0285445 A1 discloses a method and system for managing a battery system for a vehicle. A hierarchy is used to disconnect electrical loads from the battery system. An input signal representative of a condition of one of the components of one of the systems in a vehicle is provided. The input signal is compared with at least one parameter to determine whether the condition indicates that at least one of the electrical loads should be disconnected from the battery. At least one of the electrical loads can then be disconnected from the battery according to a predetermined hierarchy if the input signal when compared to the parameter indicates that the electrical load should be disconnected from the battery. In accordance with one embodiment, the battery management system determines whether the vehicle engine is off and then sheds one or more vehicle loads and provides an output signal to notify a vehicle system and/or the driver of the disconnection of the loads. The battery management system may then send a signal to start the vehicle engine. A disadvantage of the battery management system is that it is rather complex. A driver who lacks the technical understanding of how the battery management system operates may incorrectly conclude that the vehicle is defective when certain vehicle accessories are disabled in accordance with a given hierarchy.

U.S. Pat. No. 6,424,157 B1 discloses a method and a device for monitoring, controlling and reporting on the condition of a vehicle battery. The monitoring device measures a battery voltage and a current drain during engine start and computes the battery dynamic internal resistance and the dynamic polarization resistance. The monitoring device also measures the quiescent voltage of the vehicle battery when the vehicle electrical system has only a small current drain and computes the state of charge of the vehicle battery. The monitoring device furthermore analyzes the battery condition in order to predict the time during which the vehicle battery can still start the engine and a minimum ambient temperature at which the vehicle battery will be able to start the engine. The measured and computed quantities can be displayed as messages as well as warnings to advise the driver of problems related to the vehicle battery.

U.S. Pat. No. 5,900,734 discloses a low battery voltage detection and warning system which is connected to a vehicle battery. The low battery voltage detection and warning system includes a voltage sensor connected to the vehicle battery for sensing a voltage value of the vehicle battery and a processing device connected to the voltage sensor for comparing the sensed voltage value to a reference value and determining whether the sensed voltage value is less than the reference value. An alarm is connected to the processing device for generating an alarm upon a determination by the processing device that the sensed voltage value is less than the reference value. The alarm may produce on audible alarm and/or a visual alarm to alert the operator of the motor vehicle that the battery voltage is low and should be checked.

U.S. Pat. No. 5,130,659 discloses a battery monitor for indicating the projected time until the battery reaches a lower threshold value indicative of the energy capacity of the battery. The battery monitor includes a microprocessor which iteratively reads the value of the battery voltage. The microprocessor determines the rate of discharge of the battery and projects the future values of the battery voltage as well as the projected time at which the battery voltage attains the threshold voltage. The projected time is displayed on a visual indicator.

U.S. Pat. No. 6,472,875 B1 discloses a method for detecting a defect of a vehicle battery. The time dependence of the discharge voltage across the terminals of the vehicle battery is analyzed. First, at least two successive values of the discharge voltage of the vehicle battery are measured when cranking the engine of the motor vehicle for at least two consecutive engine cycles. A difference of the measured voltage values is determined and the onboard computer of the motor vehicle deduces whether the battery is charged or defective.

U.S. Pat. No. 6,097,193 discloses a vehicle starting battery cold-cranking amps meter which includes a current source, a voltage meter, a current meter, a temperature meter, and a control unit. The current source produces a current pulse during a brief time interval at a known magnitude that is less than the rated cold-cranking amps of the vehicle battery being tested. The voltage meter measures a battery terminal voltage of the vehicle battery while the current source is sourcing current to or sinking a current from the vehicle battery being tested. The control unit determines the internal impedance of the vehicle battery from the terminal voltage of the vehicle battery while the current source is sourcing current to or sinking current from the vehicle battery being tested and determines cold-cranking amps from the internal impedance and an output of the temperature meter. A disadvantage of the battery monitoring devices disclosed in U.S. Pat. Nos. 6,424,157 B1, 5,900,734, 5,130,659, 6,472,875 B1, and 6,097,193 is that a driver may ignore the messages and warnings and the vehicle battery may become discharged or damaged despite the warnings.

A particular problem arises in case of a vehicle accessory that requires a considerable amount of electric energy. This is for example the case in a motor vehicle with a folding hardtop roof that is made of metal panels and glass panels. Such a folding hardtop roof is for example disclosed in U.S. Pat. Nos. 7,063,371 B2 and 7,014,247 B2. Especially motor vehicles having four seats have correspondingly large and heavy roof and trunk lid panels that need to be lifted, rotated, and displaced when the hardtop roof is opened or closed. Electric motors are used to open and close the folding hardtop roof. These electric motors constitute a considerable electric load and the vehicle battery is accordingly stressed when the folding hardtop roof is opened or closed. The above-described methods and devices for monitoring or managing a vehicle battery may therefore be insufficient to protect the vehicle battery.

SUMMARY OF THE INVENTION

It is accordingly an object of the invention to provide a method for controlling a power-operated vehicle accessory, in particular a method for controlling a power-operated vehicle roof, which overcomes the above-mentioned disadvantages of the heretofore-known methods of this general type and which prevents the vehicle battery from being drained or damaged by the operation of the vehicle accessory when the engine of the vehicle is not running. It is a further object of the invention to provide a method for controlling a power-operated vehicle accessory, in particular a method for controlling a power-operated vehicle roof, which protects the vehicle battery in a simple and cost-effective manner. It is another object of the invention to provide a motor vehicle configuration including a power-operated folding roof.

With the foregoing and other objects in view there is provided, in accordance with the invention, a method for controlling a power-operated vehicle accessory which includes the steps of:

providing a power-operated vehicle accessory in a motor vehicle, the motor vehicle having an engine, the vehicle accessory being movable between a first position and a second position in response to an actuation request;

determining a total number of actuation requests for actuating the power-operated vehicle accessory in a period when the engine of the motor vehicle is off;

comparing the total number of actuation requests occurring in the period with the engine of the motor vehicle being off to a given maximum number;

blocking an actuation request for moving the power-operated vehicle accessory from the first position to the second position if the total number of actuation requests occurring in the period with the engine of the motor vehicle being off has reached the given maximum number; and providing information on a display of the motor vehicle if the total number of actuation requests occurring in the period with the engine of the motor vehicle being off has reached the given maximum number.

By blocking an actuation request when a maximum number of actuation requests has been reached while the motor vehicle was shut off, it is possible to protect the vehicle battery from being discharged or damaged. By providing information on a display, it is possible to alert the driver to start the engine in order to protect the vehicle battery.

Another mode of the method according to the invention includes providing a folding hardtop roof as the power-operated vehicle accessory, the folding hardtop roof being movable between a closed position as the first position and an open position as the second position; and blocking an actuation request for moving the folding hardtop roof from the closed position to the open position if the total number of actuation requests occurring in the period with the engine of the motor vehicle being off has reached the given maximum number. The above-defined method of protecting a vehicle battery is in particular useful for vehicle accessories that draw a substantial amount of current such as a folding hardtop roof.

Another mode of the method according to the invention includes providing a folding hardtop roof as the power-operated vehicle accessory, the folding hardtop roof being movable between a closed position as the first position and an open position as the second position; sensing a weather condition indicative of rain; and carrying out an actuation request for moving the folding hardtop roof from the open position to the closed position even if the total number of actuation requests occurring in the period with the engine of the motor vehicle being off has reached the given maximum number in case the sensed weather condition indicates rain. In order to avoid any delay when closing the vehicle hardtop roof when it rains, it is advantageous not to block an actuation request for closing the hardtop vehicle roof when rain is detected. Otherwise, the driver would have to start the engine before the folding hardtop roof could be closed.

Another mode of the method according to the invention includes providing a folding hardtop roof as the power-operated vehicle accessory, the folding hardtop roof being movable between a closed position as the first position and an open position as the second position; sensing a weather condition indicating that there is no rain; and blocking an actuation request for moving the folding hardtop roof from the open position to the closed position if the total number of actuation requests occurring in the period with the engine of the motor vehicle being off has reached the given maximum number and if the sensed weather condition indicates that there is no rain.

Another mode of the method according to the invention includes providing a folding hardtop roof as the power-operated vehicle accessory, the folding hardtop roof being movable between a closed position as the first position and an open position as the second position; and controlling an actuation request by selectively blocking an actuation request for moving the folding hardtop roof from the closed position to the open position if the total number of actuation requests occurring in the period with the engine of the motor vehicle being off has reached the given maximum number, and carrying out an actuation request for moving the folding hardtop roof from the open position to the closed position even if the total number of actuation requests occurring in the period with the engine of the motor vehicle being off has reached the given maximum number. In this manner it is advantageously possible to avoid any delay when closing the folding hardtop roof while at the same time it is possible to protect the vehicle battery because actuation requests for opening the folding hardtop roof are blocked after the maximum number of actuation requests has been reached while the engine is shut off.

Another mode of the method according to the invention includes providing, as the information on the display of the motor vehicle, a driver alert requesting that the engine be started, if the total number of actuation requests occurring in the period with the engine of the motor vehicle being off has reached the given maximum number. By providing the driver alert it can be avoided that the driver incorrectly assumes that the vehicle is defective when the driver's actuation request is blocked. In addition, the driver alert advantageously provides the driver with information on how the blocking of the actuation request can be overcome.

Another mode of the method according to the invention includes using an integer number of less than ten as the given maximum number, and preferably using at most two as the given maximum number. The maximum number is preferably selected such that the folding hardtop roof can at least be closed when the engine is off. However, if the capacity of the vehicle battery is sufficiently large, the maximum number can be set such that the folding hardtop roof can be opened and closed several times.

With the objects of the invention in view there is also provided, a motor vehicle configuration, including:

an engine configured to be selectively turned on and off;

a vehicle battery configured to be charged when the engine is turned on;

a folding roof movable between a closed position and an open position;

an electro-hydraulic system connected to the vehicle battery and to the folding roof for moving the folding roof between the closed position and the open position;

an electronic control unit operatively connected to the electro-hydraulic system for controlling the electro-hydraulic system;

the electronic control unit being programmed to determine a total number of roof actuation requests for actuating the folding roof in a period when the engine is off;

the electronic control unit being programmed to compare the total number of roof actuation requests occurring in the period when the engine is off to a given maximum number, the electronic control unit being programmed to block a roof actuation request for moving the folding roof from the closed position to the open position if the electronic control unit determines that the total number of roof actuation requests occurring in the period when the engine is off has reached the given maximum number; and a display operatively connected to the electronic control unit for providing a driver alert information if the electronic control unit determines that the total number of roof actuation requests occurring in the period when the engine is off has reached the given maximum number.

According to another feature of the invention, the folding roof is a folding hardtop roof having at least one panel selected from the group consisting of a glass panel and a metal panel; the electro-hydraulic system includes an electric motor, a hydraulic pump and hydraulic cylinders, the electric motor driving the hydraulic pump, the hydraulic pump operating the hydraulic cylinders, the hydraulic cylinders moving the folding hardtop roof between the closed position and the open position. Operating a folding hardtop roof that has relatively heavy glass or metal panels requires more energy than operating a soft-top folding roof and therefore it is advantageous to use the method of controlling a folding vehicle roof according to the invention for folding hardtop roofs.

According to another feature of the invention, the electric motor has a rated power output greater than one hundred Watts. The electric motor for driving the hydraulic pump may have a power output of several hundred Watts and therefore it is advantageous to use the method for controlling a folding vehicle roof according to the invention in order to protect the vehicle battery.

According to another feature of the invention, the folding hardtop roof is dimensioned for a motor vehicle having at least four seats. A folding hardtop roof for a vehicle with four seats has larger and thus heavier roof panels than a folding hardtop roof for a vehicle with only two seats. Thus, the folding hardtop roof requires more power when being opened and closed. It is therefore advantageous to use the battery protection according to the invention in case of a vehicle with four seats.

According to another feature of the invention, the display provides a request to start the engine as the driver alert information if the electronic control unit determines that the total number of roof actuation requests occurring in the period when the engine is off has reached the given maximum number.

According to another feature of the invention, a sensor is operatively connected to the electronic control unit, the sensor provides a signal indicative of a weather condition; and the electronic control unit evaluates the signal indicative of the weather condition and, if the electronic control unit determines that the signal is indicative of rain, the electronic control unit carries out a roof actuation request for moving the folding roof from the open position to the closed position even if the total number of roof actuation requests occurring when the engine is off has reached the given maximum number. This mode of the method according to the invention advantageously avoids any delay when closing the folding hardtop roof during rain.

According to another feature of the invention, a sensor is operatively connected to the electronic control unit, the sensor provides a signal indicative of a weather condition; and the electronic control unit evaluates the signal indicative of the weather condition and, if the electronic control unit determines that the signal is not indicative of rain, the electronic control unit blocks a roof actuation request for moving the folding roof from the open position to the closed position if the total number of roof actuation requests occurring in the period when the engine is off has reached the given maximum number.

According to another feature of the invention, the electronic control unit is programmed to block a roof actuation request for moving the folding roof from the open position to the closed position if the total number of roof actuation requests occurring in the period when the engine is off has reached the given maximum number.

Alternatively, the electronic control unit is programmed to carry out a roof actuation request for moving the folding roof from the open position to the closed position even if the total number of roof actuation requests occurring in the period when the engine is off has reached the given maximum number. This mode is advantageous in case the motor vehicle is not equipped with a rain sensor because it allows closing the folding hardtop roof without delay.

According to another feature of the invention there is provided, a roof switch operatively connected to the electronic control unit, the roof switch providing a signal indicative of a roof actuation request to the electronic control unit when being actuated; side windows selectively movable in a downward direction and an upward direction; electric motors for selectively moving the side windows in the downward direction and the upward direction, the electric motors being operatively connected to the electronic control unit; the electronic control unit controlling the electric motors for the side windows such that the side windows move in coordination with the folding roof; and the battery providing electric power to the electric motor of the electro-hydraulic system and to the electric motors for moving the side windows. The battery protection according to the invention is especially useful if, in addition to the electric motor for the folding hardtop roof, further electric motors, such as the electric motors for side windows, draw current from the vehicle battery.

Other features which are considered as characteristic for the invention are set forth in the appended claims.

Although the invention is illustrated and described herein as embodied in a method for controlling a power-operated vehicle accessory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
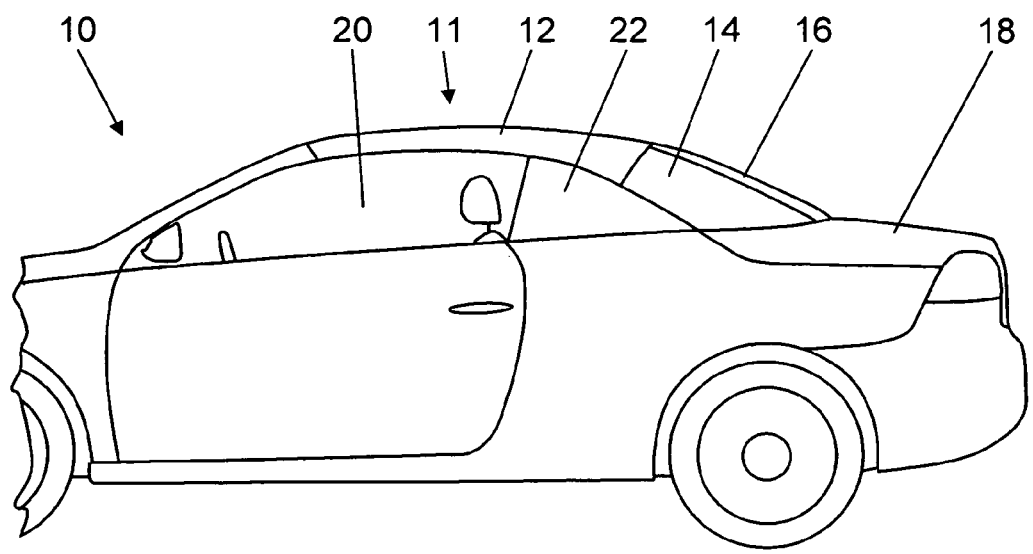
FIG. 1 is a partial diagrammatic side view of a motor vehicle having a folding hardtop roof in a closed position in accordance with the invention.

Referring now to the figures of the drawings in detail and first, particularly, to FIG. 1 thereof, there is shown a motor vehicle 10 having a folding hardtop roof 11 and side windows 20, 22. The folding hardtop roof 11 includes a front roof portion 12 and rear roof portion 14. The rear roof portion 14 includes a rear window 16. The front roof portion 12 and the rear roof portion 14 are configured such that they can be stored under the trunk lid 18 when the folding hardtop roof 11 is in its open position.

Figure 2:
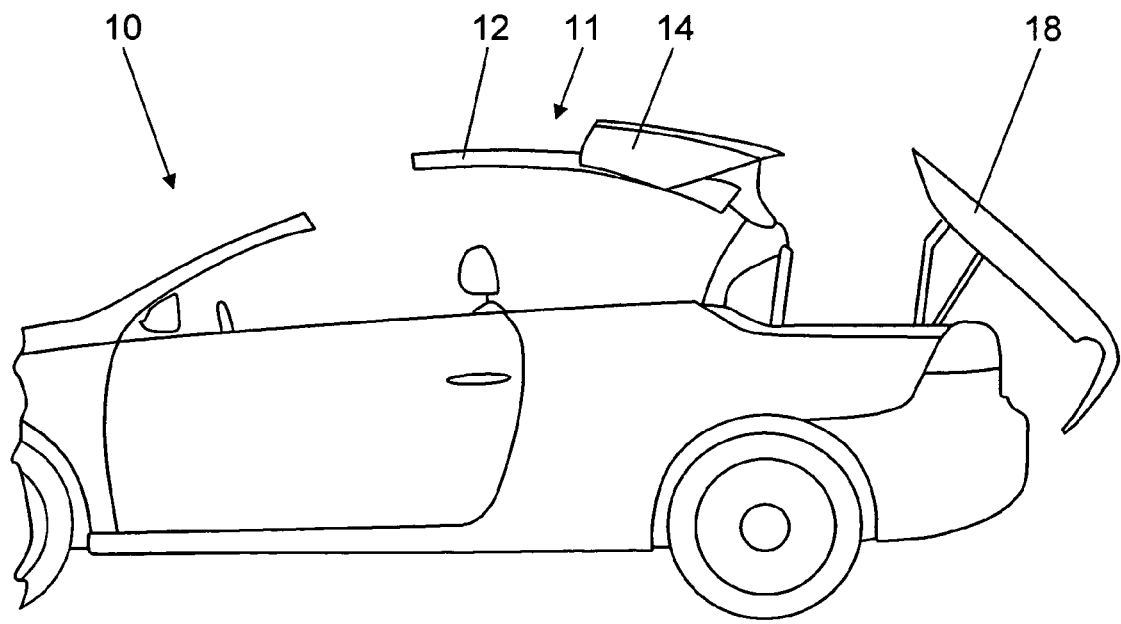
FIG. 2 is a partial diagrammatic side view of a motor vehicle having a folding hardtop roof in a partly opened position in accordance with the invention.

FIG. 2 is a partial diagrammatic side view of the motor vehicle 10 with the folding hardtop roof 11 in a partly opened position. FIG. 2 shows the front roof portion 12 after it has been lifted and moved toward the rear of the motor vehicle 10. The rear roof portion 14 has also been lifted and is positioned above the front roof portion 12. The trunk lid 18 has been lifted and rotated in order to allow the front roof portion 12 and the rear roof portion 14 to be positioned in the trunk space of the motor vehicle 10. An electro-hydraulic system 30 including a number of hydraulic cylinders 34 is used to open and close the folding hardtop roof 11.

Figure 3:
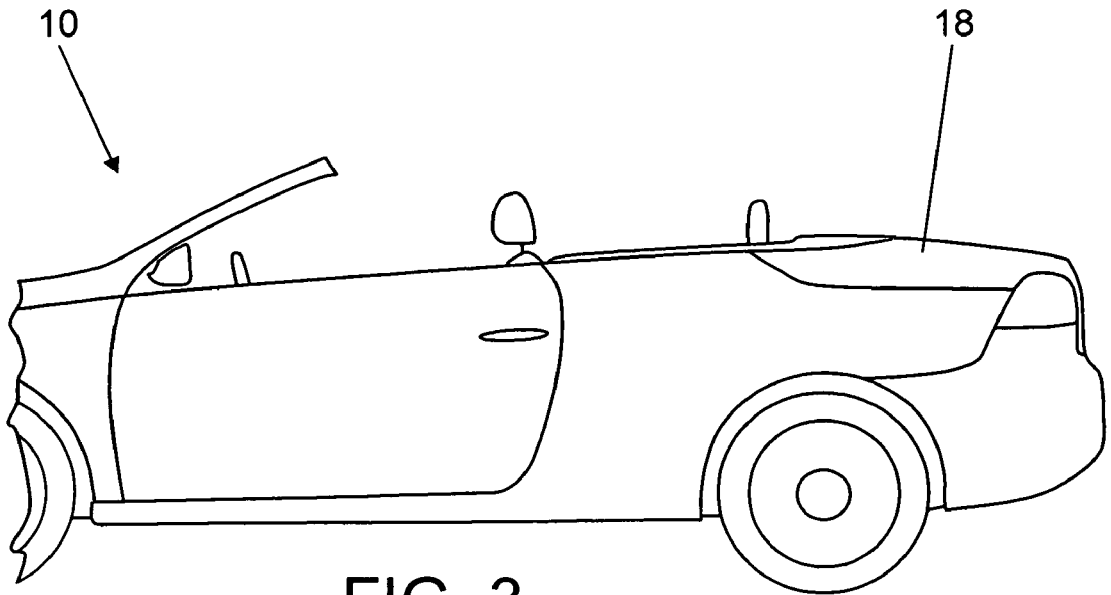
FIG. 3 is a partial diagrammatic side view of a motor vehicle having a folding hardtop roof in an open position in accordance with the invention.

FIG. 3 is a partial diagrammatic side view of the motor vehicle 10 with the folding hardtop roof 11 in an open position. When in the open position, the folding hardtop roof 11 is stored in the trunk space underneath the trunk lid 18.

Figure 4:
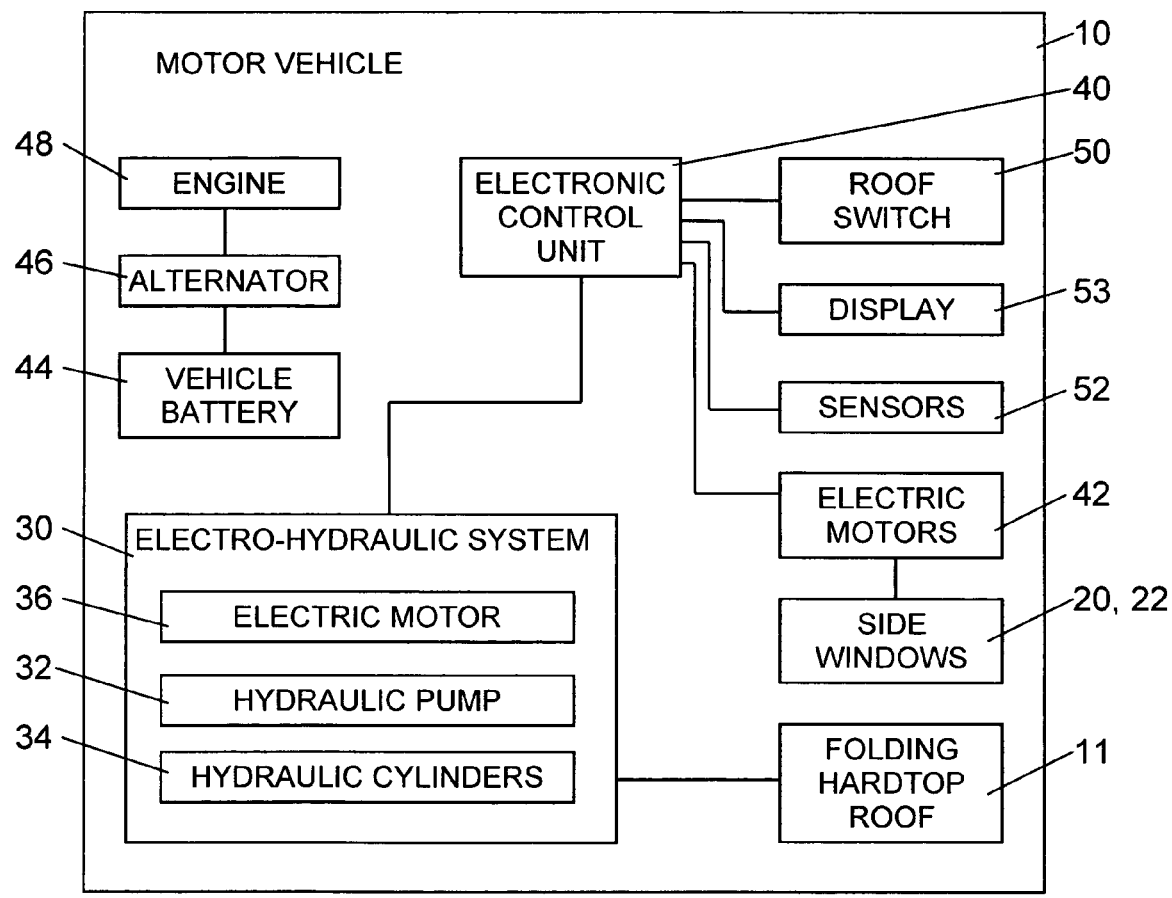
FIG. 4 is a schematic overview illustrating components of a motor vehicle with a folding hardtop roof in accordance with the invention.

FIG. 4 is a schematic overview illustrating components of a motor vehicle 10 with a folding hardtop roof 11. The electro-hydraulic system 30 includes a hydraulic pump 32 and hydraulic cylinders 34 for opening and closing the folding hardtop roof 11. An electric motor 36 drives a hydraulic pump 32 when activated by the electronic control unit 40. The side windows 20, 22 can be opened and closed by electric motors 42 which are also activated by the electronic control unit 40. The electric motor 36 for driving the hydraulic pump 32 and the electric motors 42 for opening and closing the side windows 20, 22 are connected to the vehicle battery 44. An alternator 46 is provided for charging the vehicle battery 44 and for providing electric power to the electric motors 36, 42 when the engine 48 of the motor vehicle 10 is running. When the engine 48 is not running, electric power for the electric motors 36, 42 is provided by the vehicle battery 44. In this case, the vehicle battery 44 has to provide hundreds of Watts in electrical power when opening or closing the folding hardtop roof 11. The vehicle battery 44 can thus be rapidly discharged when the folding roof top 11 is repeatedly opened and closed. The folding hardtop roof 11 is opened and closed by actuating a roof switch 50.

The electronic control unit 40 receives signals supplied by a number of sensors 52 in order to evaluate external information and monitor relevant vehicle parameters. The sensors 52 include for example position sensors for monitoring the movement of the front roof portion 12, the rear roof portion 14 and the trunk lid 18. The electronic control unit 40 allows a movement of the front roof portion 12, the rear roof portion 14 and the trunk lid 18 only if information provided by the sensors 52 indicate that it is safe to perform the movement. If the motor vehicle 10 is equipped with a parking aid system, the sensors integrated in the vehicle bumper can be used to monitor the space behind the motor vehicle for obstacles before activating the folding hardtop roof 11. If the sensors detect an obstacle, the opening of the folding hardtop roof can be blocked.

The electronic control unit 40 is not only programmed to control the folding hardtop roof 11 in normal operating conditions, but is also programmed to control the folding hardtop roof 11 in case one or more of the components associated with the operation of the folding hardtop roof 11 are defective. Various failsafe operations, which are stored in the electronic control unit 40, allow a limited operation of the folding hardtop roof 11 depending on which of the components is defective.

The electronic control unit 40 is further programmed to detect the number of actuations of the folding hardtop roof 11 in order to ensure that the folding hardtop roof 11 can be opened and/or closed only a given number of times when the engine 48 is not running. An actuation of the folding hardtop roof 11 is understood to be an opening of the folding hardtop roof 11 or a closing of the folding hardtop roof 11. In accordance with an embodiment of the invention, the given number of times that the folding hardtop roof 11 can be opened or closed when the engine is not running is less than ten. This allows the driver to open or close the folding hardtop roof 11 a number of times without damaging the vehicle battery or discharging the vehicle battery 44 to an extent that the vehicle battery 44 can no longer start the engine 48. In accordance with a preferred embodiment, the given number of actuations is limited to one or two actuations of the folding vehicle roof 11 when the engine 48 is not running. In case the driver attempts to actuate the folding hardtop roof 11 more often than the given (maximum) number of actuations by actuating the roof switch 50 while the engine 48 of the motor vehicle 10 is shut off, then the electronic control unit 40 is programmed to provide information on a display 53. The information on the display 53 is preferably a notice requesting the driver to start the engine 48 so that the vehicle battery 44 is not drained or damaged and/or a notice advising the driver that actuating the folding hardtop roof 11 when the engine 48 is not running may drain or damage the vehicle battery 44. The electronic control unit 40 is programmed to block an actuation of the folding vehicle roof 11 once the given number of actuations of the folding hardtop roof, when the engine is not running, has been reached. In accordance with a preferred embodiment, the electronic control unit 40 is programmed to prevent a delay or blocking of an actuation for closing the folding hardtop roof 11 in case a respective one of the sensors 52 determines that it rains. Alternatively, if no sensor for detecting rain is provided, the electronic control unit 40 may be programmed not to delay or prevent an actuation for closing the folding hardtop roof 11.

The control of the folding hardtop roof 11 is performed in the following manner. In order for the folding hardtop roof 11 to be opened, the following conditions have to be met. The ignition must be "on" and the voltage of the vehicle battery 44 must be sufficiently high for opening the folding hardtop roof 11. Further, the trunk lid 18 must be closed and there must be sufficient space behind the motor vehicle 10 for the trunk lid 18 to move backwards as shown in FIG. 2. As explained above, if the motor vehicle 10 is equipped with a parking aid system, sensors integrated in the vehicle bumper can be used to monitor the space behind the motor vehicle 10 for obstacles. In addition, the roof switch 50 must have been actuated before the folding hardtop roof 11 can be opened and the vehicle speed must be below a given value. If these conditions are met, first the side windows 20, 22 are lowered. This is necessary because otherwise the front roof portion 12 and/or rear roof portion 14 of the folding hardtop roof 11 would collide with the side window 22 when they are lowered into the trunk space. As the side windows 20, 22 are lowered, the front roof portion 12 and the rear roof portion 14 start moving from a position as shown in FIG. 1 to a position as shown in FIG. 2. The front roof portion 12 and the rear roof portion 14 subsequently move into the trunk space and the trunk lid 18 closes as is shown in FIG. 3. The movement of the front roof portion 12 and the rear roof portion 14 is monitored by sensors as mentioned above.

Figure 5:
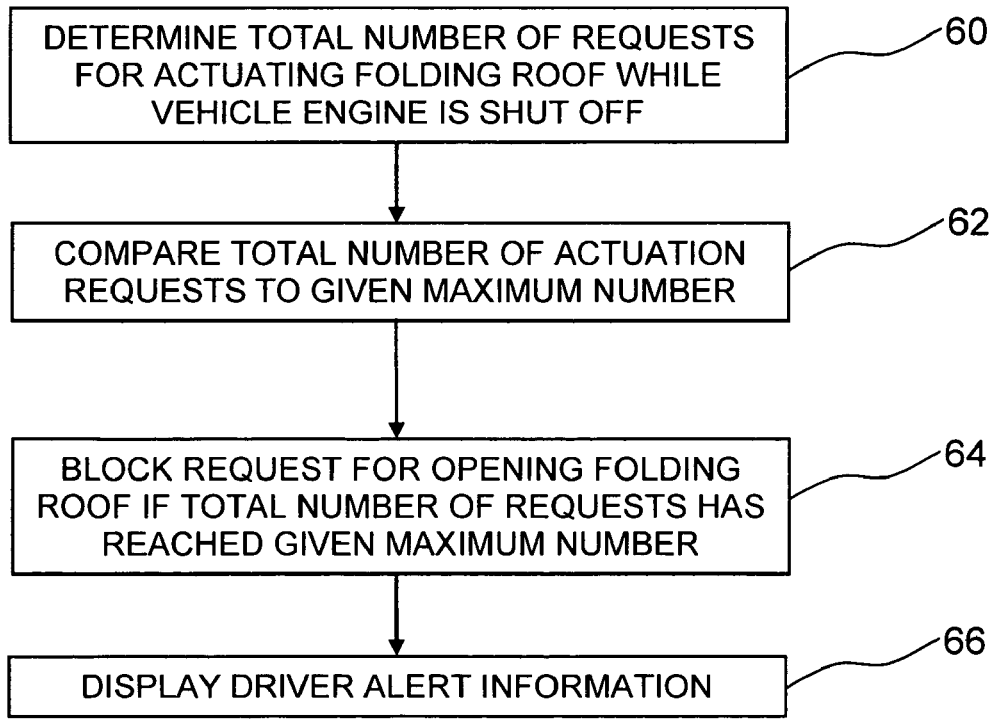
FIG. 5 is a flowchart illustrating basic steps of a method for controlling a folding vehicle roof in accordance with the invention.

FIG. 5 is a flowchart illustrating basic steps of a method for controlling a folding vehicle roof. In accordance with the invention, the total number actuation requests while the engine 48 is shut off is determined by the electronic control unit 40 as is indicated by step 60. In a step 62, the electronic control unit 40 compares the total number of actuation requests to a given maximum number of requests. If the total number of actuation requests counted while the engine 48 was shut off has reached the given maximum number, then the electronic control unit 40 blocks at least an actuation request for opening the folding hardtop roof 11 as is illustrated by step 64. In accordance with an exemplary mode of the method of the invention, an actuation request for closing the folding hardtop roof 11 will not be blocked in case of a condition that indicates rain. In a further step 66, a driver alert information is provided on a display 53 in the motor vehicle 10. The driver alert information is preferably a request to start the engine 48 of the motor vehicle 10.

Figure 6:
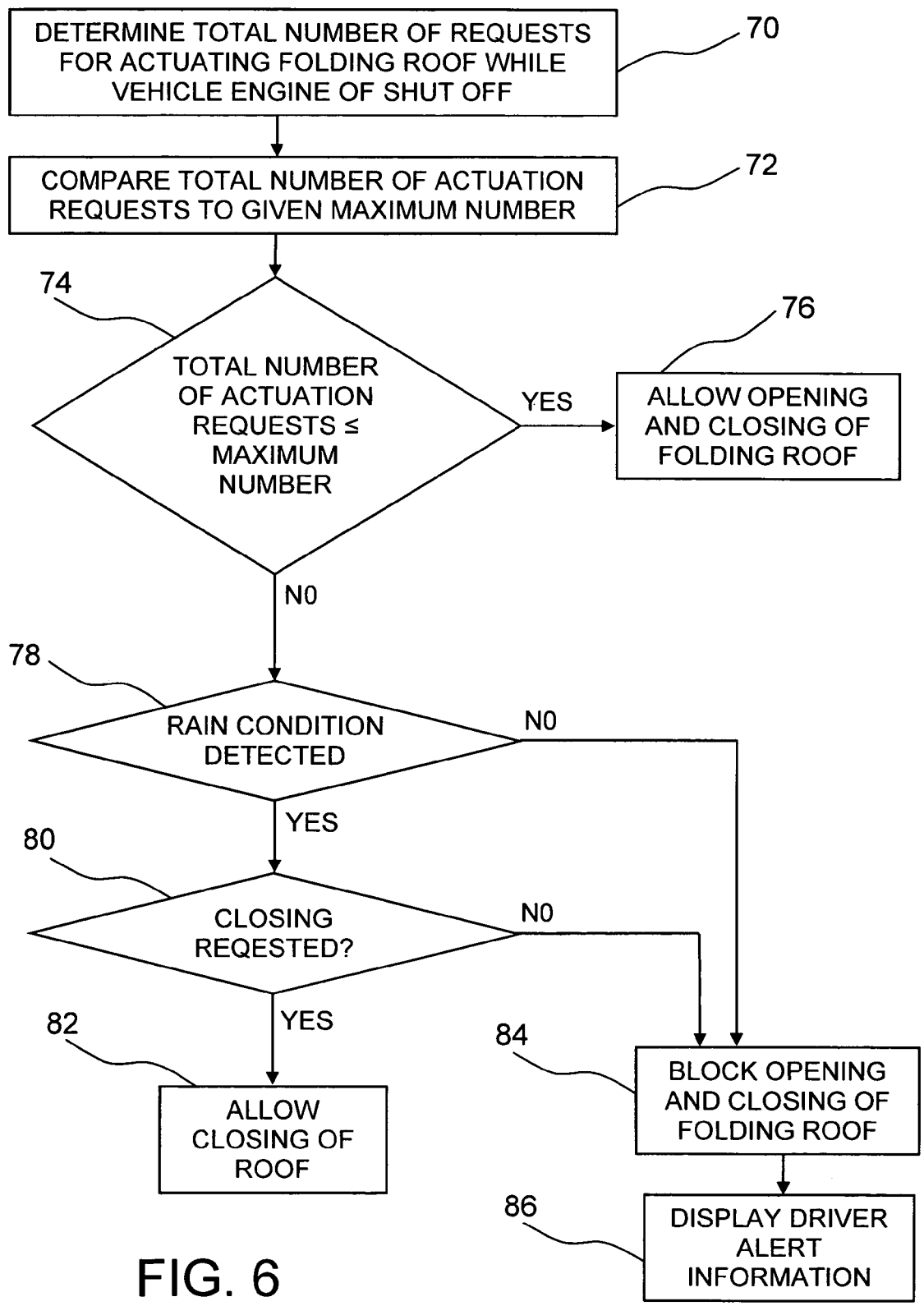
FIG. 6 is a flowchart illustrating an exemplary mode of a method for controlling a folding vehicle roof in accordance with the invention.

FIG. 6 is a flowchart illustrating an exemplary mode of a method for controlling a folding vehicle roof 11 in accordance with the invention. In an initial step 70, the electronic control unit 40 determines the total number of actuation requests for opening and closing the folding hardtop roof 11 when the engine 48 is shut off. In order to determine the total number of actuation requests for opening and closing the folding hardtop roof 11 while the engine 48 is shut off, the electronic control unit 40 may for example use a counter that starts counting the actuation requests once the engine 48 is shut off and is reset when the engine 48 is started up again. In step 72, the electronic control unit 40 compares the total number of actuation requests to a given maximum number. The maximum number is selected such that the vehicle battery 44 cannot be excessively discharged or damaged by the operation of the folding hardtop roof 11 when the engine 48 is off. In order to protect the battery, the maximum number may for example be set such that the folding hardtop roof 11 can be opened and closed once or twice with the engine 48 shut off. If step 74 determines that the maximum number of actuation requests has not yet been reached, then the electronic control unit 40 allows an opening and closing of the folding hardtop roof 11 as is indicated by step 76. If step 74 determines that the maximum number of actuation requests has been reached, then a further step 78 determines whether it is raining. If step 78 determines that it is not raining, then the electronic control unit 40 blocks in step 84 the request for opening and the request for closing the folding hardtop roof 11 because the maximum number of actuation requests has been reached. In a step 86, the display 53 provides a driver alert information and requests that the engine 48 be started. After the driver starts the engine 48, the electronic control unit 40 allows the driver to open and close the vehicle hardtop roof 11 by actuating the roof switch 50. If step 78 determines that it is raining, then the electronic control unit 40 will not delay or block an actuation request for closing the folding hardtop roof 11. Accordingly, if step 80 determines that the actuation request is a request for closing the folding hardtop roof 11, then the electronic control unit 40 will allow a closing of the folding hardtop roof 11 as is indicated by step 82.

The determination whether it is raining may be made by providing one of the sensors 52 as a rain sensor whose output signal provides information about whether it is raining. If the motor vehicle 10 is not equipped with a rain sensor or any other method for determining whether it is raining, the electronic control unit 40 may programmed such that a request for opening the folding hardtop roof 11 will be blocked if the maximum number of actuation requests has been reached and such that a request for closing the folding hardtop roof 11 will not be not blocked even if the maximum number of actuation requests has been reached. Such a mode would avoid any delay when closing the folding hardtop roof 11 while still providing protection for the vehicle battery 44.

What is claimed is:

1. A method for controlling a folding roof, the method which comprises:
   providing a motor vehicle configuration, including:
   an engine configured to be selectively turned on and off;
   a vehicle battery configured to be charged when the engine is turned on;
   a folding roof movable between a closed position and an open position;
   an electro-hydraulic system connected to the vehicle battery and to the folding roof for moving the folding roof between the closed position and the open position;
   an electronic control unit operatively connected to the electro-hydraulic system for controlling the electro-hydraulic system; and
   a display operatively connected to the electronic control unit for providing a driver alert information;
   determining, with the electronic control unit, a total number of roof actuation requests for actuating the folding roof in a period when the engine of the motor vehicle configuration is off;
   comparing, with the electronic control unit, the total number of roof actuation requests occurring in the period with the engine of the motor vehicle configuration being off to a given maximum number;
   blocking, with the electronic control unit, a roof actuation request for moving the folding roof from the closed position to the open position if the total number of roof actuation requests occurring in the period with the engine of the motor vehicle configuration being off has reached the given maximum number; and
   providing the driver alert information on the display of the motor vehicle configuration if the total number of roof actuation requests occurring in the period with the engine of the motor vehicle configuration being off has reached the given maximum number.

2. The method according to claim 1, which comprises:
   sensing a weather condition indicative of rain; and
   carrying out a roof actuation request for moving the folding roof from the open position to the closed position even if the total number of roof actuation requests occurring in the period with the engine of the motor vehicle configuration being off has reached the given maximum number if the sensed weather condition indicates rain.

3. The method according to claim 1, which comprises:
   sensing a weather condition indicating that there is no rain; and
   blocking a roof actuation request for moving the folding roof from the open position to the closed position if the total number of roof actuation requests occurring in the period with the engine of the motor vehicle configuration being off has reached the given maximum number and if the sensed weather condition indicates that there is no rain.

4. The method according to claim 1, which comprises:
   controlling a roof actuation request by selectively blocking a roof actuation request for moving the folding roof from the closed position to the open position if the total number of roof actuation requests occurring in the period with the engine of the motor vehicle configuration being off has reached the given maximum number, and carrying out a roof actuation request for moving the folding roof from the open position to the closed position even if the total number of roof actuation requests occurring in the period with the engine of the motor vehicle configuration being off has reached the given maximum number.

5. The method according to claim 1, which comprises providing, as the driver alert information on the display of the motor vehicle configuration, a driver alert requesting that the engine be started, if the total number of roof actuation requests occurring in the period with the engine of the motor vehicle configuration being off has reached the given maximum number.

6. The method according to claim 1, which comprises using an integer number of less than ten as the given maximum number.

7. The method according to claim 1, which comprises using at most two as the given maximum number.

8. A motor vehicle configuration, comprising:
   an engine configured to be selectively turned on and off;
   a vehicle battery configured to be charged when said engine is turned on;
   a folding roof movable between a closed position and an open position;
   an electro-hydraulic system connected to said vehicle battery and to said folding roof for moving said folding roof between the closed position and the open position;
   an electronic control unit operatively connected to said electro-hydraulic system for controlling said electro-hydraulic system;
   said electronic control unit being programmed to determine a total number of roof actuation requests for actuating said folding roof in a period when said engine is off;
   said electronic control unit being programmed to compare the total number of roof actuation requests occurring in the period when said engine is off to a given maximum number, said electronic control unit being programmed to block a roof actuation request for moving said folding roof from the closed position to the open position if said electronic control unit determines that the total number of roof actuation requests occurring in the period when said engine is off has reached the given maximum number; and
   a display operatively connected to said electronic control unit for providing a driver alert information if said electronic control unit determines that the total number of roof actuation requests occurring in the period when said engine is off has reached the given maximum number.

9. The motor vehicle configuration according to claim 8, wherein:
   said folding roof is a folding hardtop roof having at least one panel selected from the group consisting of a glass panel and a metal panel;
   said electro-hydraulic system includes an electric motor, a hydraulic pump and hydraulic cylinders, said electric motor driving said hydraulic pump, said hydraulic pump operating said hydraulic cylinders, said hydraulic cylinders moving said folding hardtop roof between the closed position and the open position.

10. The motor vehicle configuration according to claim 9, wherein said electric motor has a rated power output greater than one hundred Watts.

11. The motor vehicle configuration according to claim 9, wherein said folding hardtop roof is dimensioned for a motor vehicle having at least four seats.

12. The motor vehicle configuration according to claim 8, wherein said display provides a request to start said engine as the driver alert information if said electronic control unit determines that the total number of roof actuation requests occurring in the period when said engine is off has reached the given maximum number.

13. The motor vehicle configuration according to claim 8, including:
- a sensor operatively connected to said electronic control unit, said sensor providing a signal indicative of a weather condition; and
- said electronic control unit evaluating the signal indicative of the weather condition and, if said electronic control unit determines that the signal is indicative of rain, said electronic control unit carries out a roof actuation request for moving the folding roof from the open position to the closed position even if the total number of roof actuation requests occurring when said engine is off has reached the given maximum number.

14. The motor vehicle configuration according to claim 8, including:
- a sensor operatively connected to said electronic control unit, said sensor providing a signal indicative of a weather condition; and
- said electronic control unit evaluating the signal indicative of the weather condition and, if said electronic control unit determines that the signal is not indicative of rain, said electronic control unit blocks a roof actuation request for moving the folding roof from the open position to the closed position if the total number of roof actuation requests occurring in the period when said engine is off has reached the given maximum number.

15. The motor vehicle configuration according to claim 8, wherein said electronic control unit is programmed to block a roof actuation request for moving said folding roof from the open position to the closed position if the total number of roof actuation requests occurring in the period when said engine is off has reached the given maximum number.

16. The motor vehicle configuration according to claim 8, wherein said electronic control unit is programmed to carry out a roof actuation request for moving the folding roof from the open position to the closed position even if the total number of roof actuation requests occurring in the period when said engine is off has reached the given maximum number.

17. The motor vehicle configuration according to claim 8, including:
- a roof switch operatively connected to said electronic control unit, said roof switch providing a signal indicative of a roof actuation request to said electronic control unit when being actuated;
- side windows selectively movable in a downward direction and an upward direction;
- electric motors for selectively moving said side windows in the downward direction and the upward direction, said electric motors being operatively connected to said electronic control unit;
- said electronic control unit controlling said electric motors for said side windows such that said side windows move in coordination with said folding roof; and
- said battery providing electric power to said electric motor of said electro-hydraulic system and to said electric motors for moving said side windows.

* * * * *